United States Patent
Jo et al.

(10) Patent No.: US 11,575,116 B2
(45) Date of Patent: Feb. 7, 2023

(54) POSITIVE ELECTRODE ACTIVE MATERIAL PARTICLE FOR SULFIDE-BASED ALL-SOLID-STATE BATTERIES

(71) Applicants: LG CHEM, LTD., Seoul (KR); THE REGENTS OF THE UNIVERSITY OF CALIFORNIA, Oakland, CA (US)

(72) Inventors: Chi Ho Jo, Daejeon (KR); Wang Mo Jung, Daejeon (KR); Dong Hun Lee, Daejeon (KR); Ying Shirley Meng, San Diego, CA (US); Abhik Banerjee, West Bengal (IN); Minghao Zhang, La Jolla, CA (US)

(73) Assignees: LG ENERGY SOLUTION, LTD., Seoul (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/361,740

(22) Filed: Mar. 22, 2019

(65) Prior Publication Data

US 2020/0303720 A1    Sep. 24, 2020

(51) Int. Cl.
*H01M 4/131* (2010.01)
*H01M 4/04* (2006.01)
(Continued)

(52) U.S. Cl.
CPC ......... *H01M 4/131* (2013.01); *H01M 4/0471* (2013.01); *H01M 4/1391* (2013.01);
(Continued)

(58) Field of Classification Search
CPC .... H01M 4/131; H01M 4/1391; H01M 4/525; H01M 4/505; H01M 4/0471;
(Continued)

(56) References Cited

U.S. PATENT DOCUMENTS 10,230,099 B2    3/2019    Uchiyama
10,236,499 B2    3/2019    Kwak et al.
(Continued)

FOREIGN PATENT DOCUMENTS

CN    105680025 B    10/2018
JP    9-330720 A    12/1997
(Continued)

OTHER PUBLICATIONS

Jung et al., "$Li_3BO_3$—$Li_2CO_3$: Rationally Designed Buffering Phase for Sulfide All-Solid-State Li-Ion Batteries", Chemistry of Materials (ACS Publications), 2018, 30 (22), total of 15 pages.
(Continued)

*Primary Examiner* — Cynthia K Walls
(74) *Attorney, Agent, or Firm* — Birch, Stewart, Kolasch & Birch, LLP

(57) ABSTRACT

A method of treating the surface of a positive electrode active material that is capable of inhibiting a reaction at the interface between a sulfide-based solid electrolyte and the positive electrode active material. A positive electrode active material particle for sulfide-based all-solid-state batteries, the surface of which is reformed, using the method and a sulfide-based all-solid-state battery, the charge/discharge characteristics of which are improved, including the same are also disclosed. The positive electrode active material particle for sulfide-based all-solid-state batteries manufactured using a dry-type method exhibits larger capacity than a positive electrode active material particle for sulfide-based all-solid-state batteries manufactured through a conventional wet-type process. In addition, the manufacturing process is simplified, and the amount of byproducts is reduced.

11 Claims, 8 Drawing Sheets

(51) Int. Cl.
  *H01M 4/1391* (2010.01)
  *H01M 4/525* (2010.01)
  *H01M 10/0562* (2010.01)
  *H01M 10/0525* (2010.01)
  *H01M 4/505* (2010.01)
  *H01M 4/02* (2006.01)

(52) U.S. Cl.
  CPC ......... *H01M 4/505* (2013.01); *H01M 4/525* (2013.01); *H01M 10/0525* (2013.01); *H01M 10/0562* (2013.01); *H01M 2004/028* (2013.01); *H01M 2300/0068* (2013.01)

(58) Field of Classification Search
  CPC ......... H01M 10/0525; H01M 10/0562; H01M 2004/028; H01M 2300/0068
  See application file for complete search history.

(56) References Cited

U.S. PATENT DOCUMENTS

| | | |
|---|---|---|
| 2009/0081554 A1 | 3/2009 | Takada et al. |
| 2014/0099541 A1 | 4/2014 | Hayashi et al. |
| 2015/0024280 A1 | 1/2015 | Uchiyama |
| 2016/0013476 A1 | 1/2016 | Oh et al. |
| 2016/0079597 A1 | 3/2016 | Fujiki et al. |
| 2017/0222221 A1 | 8/2017 | Park et al. |
| 2018/0287135 A1 | 10/2018 | Shin et al. |
| 2018/0351169 A1 | 12/2018 | Oh et al. |
| 2019/0207253 A1 | 7/2019 | Makino et al. |
| 2019/0341599 A1 | 11/2019 | Lee et al. |
| 2020/0185709 A1 | 6/2020 | Zhou et al. |

FOREIGN PATENT DOCUMENTS

| | | |
|---|---|---|
| JP | 2008-103244 A | 5/2008 |
| JP | 2012-89406 A | 5/2012 |
| JP | 4982866 B2 | 5/2012 |
| JP | 2012-243428 A | 12/2012 |
| JP | 2015-201388 A | 11/2015 |
| JP | 2015-536558 A | 12/2015 |
| JP | 2018-500720 A | 1/2018 |
| JP | 2018-534734 A | 11/2018 |
| KR | 10-2013-0130862 A | 12/2013 |
| KR | 10-1582394 B1 | 1/2016 |
| KR | 10-2016-0032664 A | 3/2016 |
| KR | 10-2018-0041872 A | 4/2018 |
| KR | 10-2018-0072104 A | 6/2018 |
| KR | 10-2018-0084727 A | 7/2018 |
| KR | 10-1886514 B1 | 8/2018 |
| KR | 10-2018-0131448 A | 12/2018 |
| WO | WO 2018/047946 A1 | 3/2018 |
| WO | WO 2018/117644 A1 | 6/2018 |
| WO | WO 2019/040533 A1 | 2/2019 |

OTHER PUBLICATIONS

Supplementary European Search Report for EP 20 77 9868, dated Feb. 4, 2022.
International Search Report and Written Opinion dated in PCT/KR2020/003908 dated Jun. 30, 2020.

[FIG. 1]
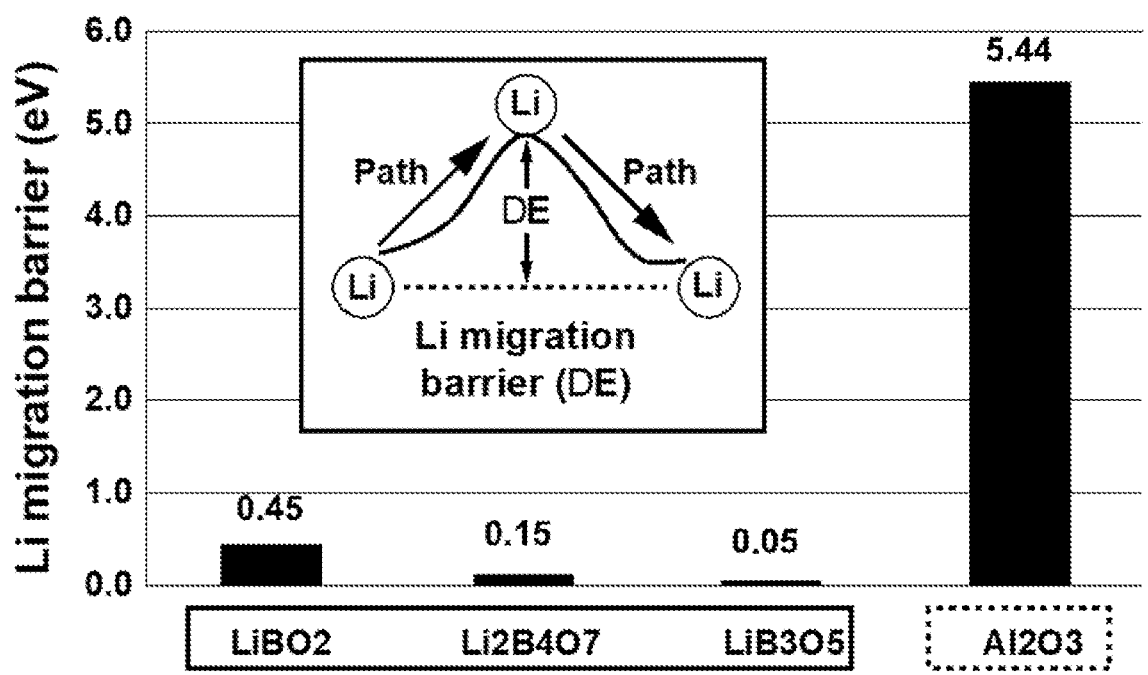

[FIG. 2]
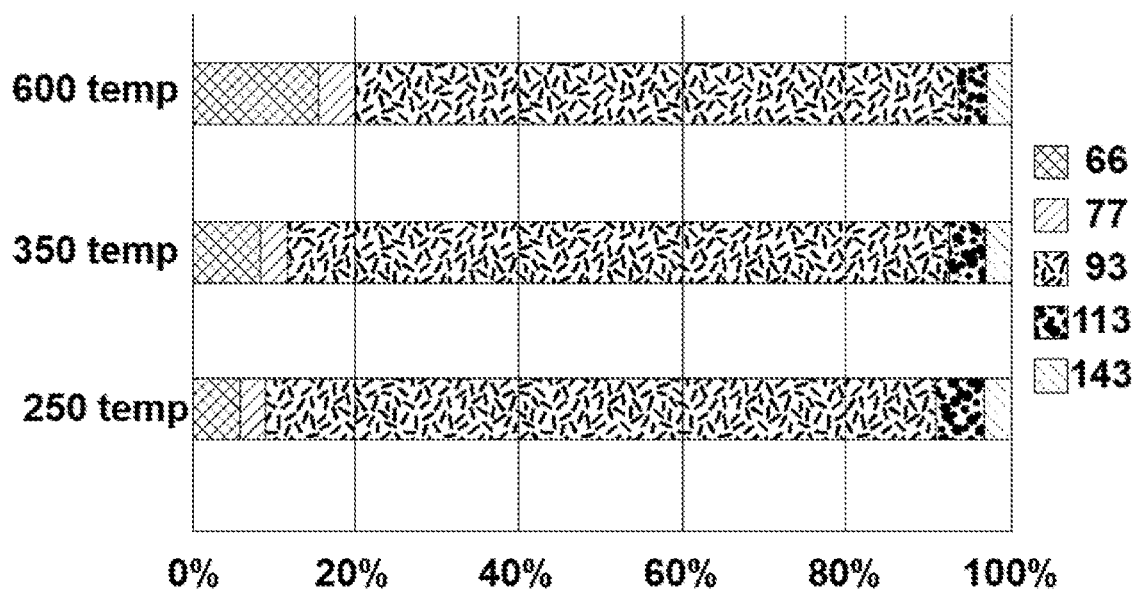

[FIG. 3]
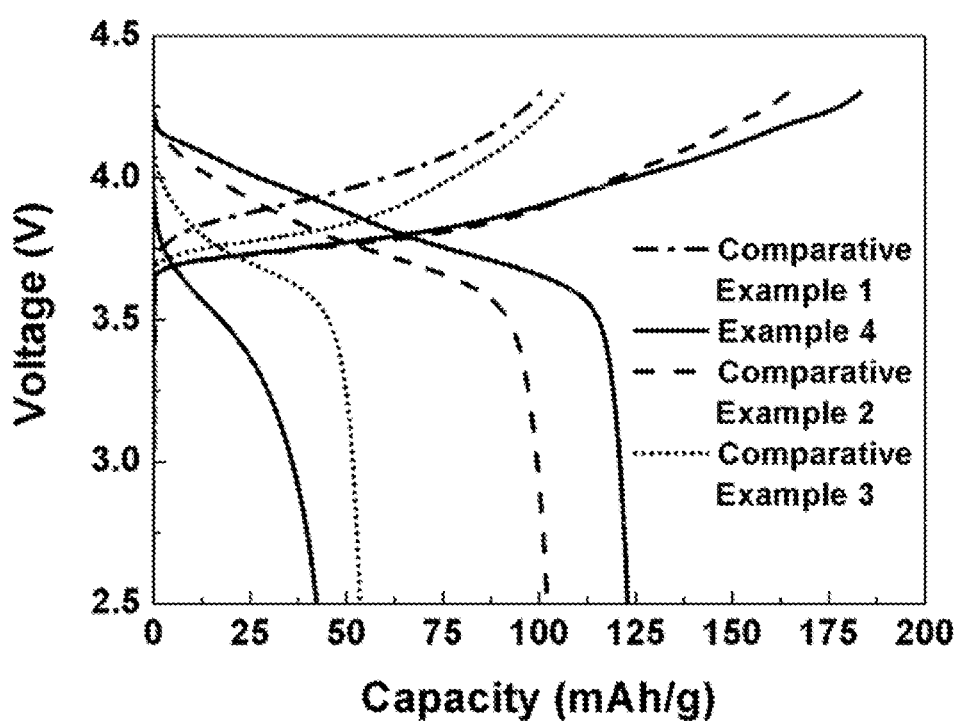

[FIG. 4]
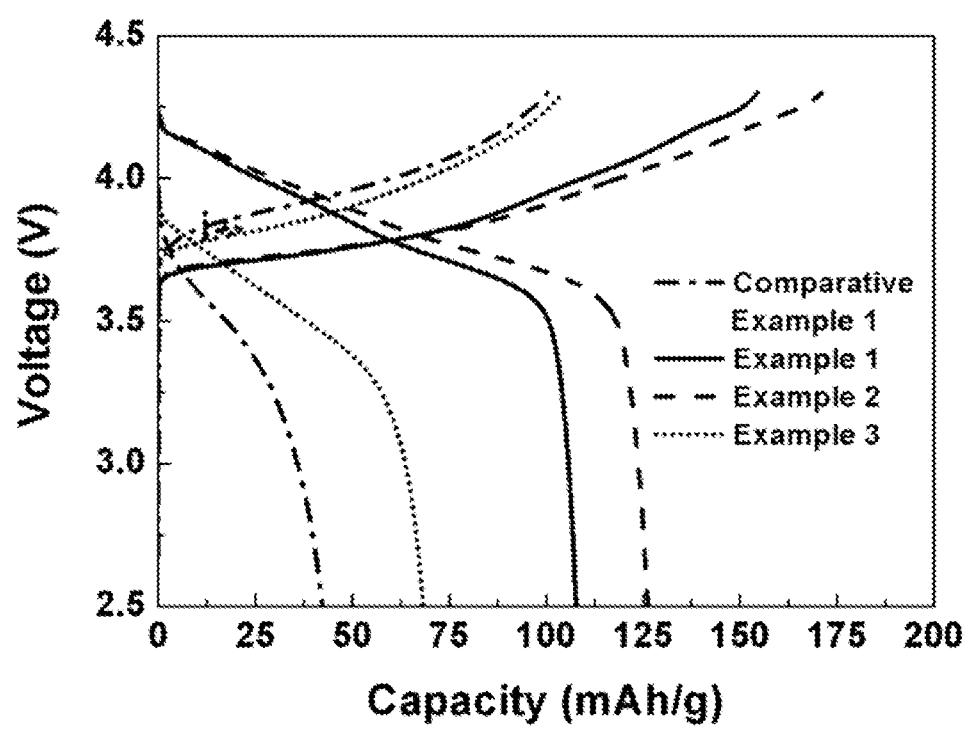

【FIG. 5】
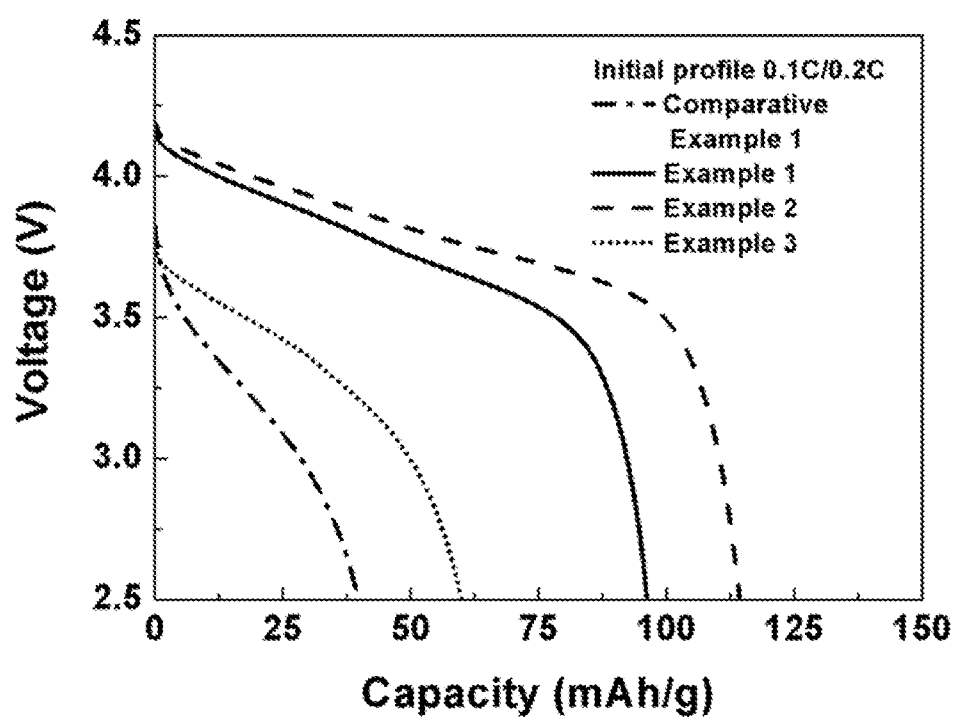

[FIG. 6]
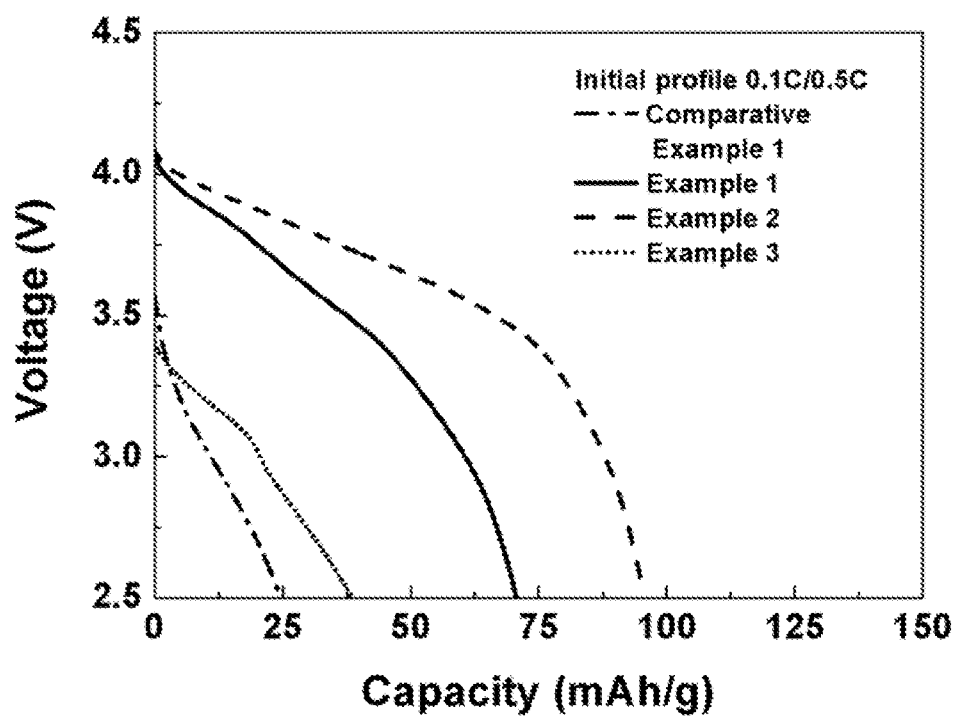

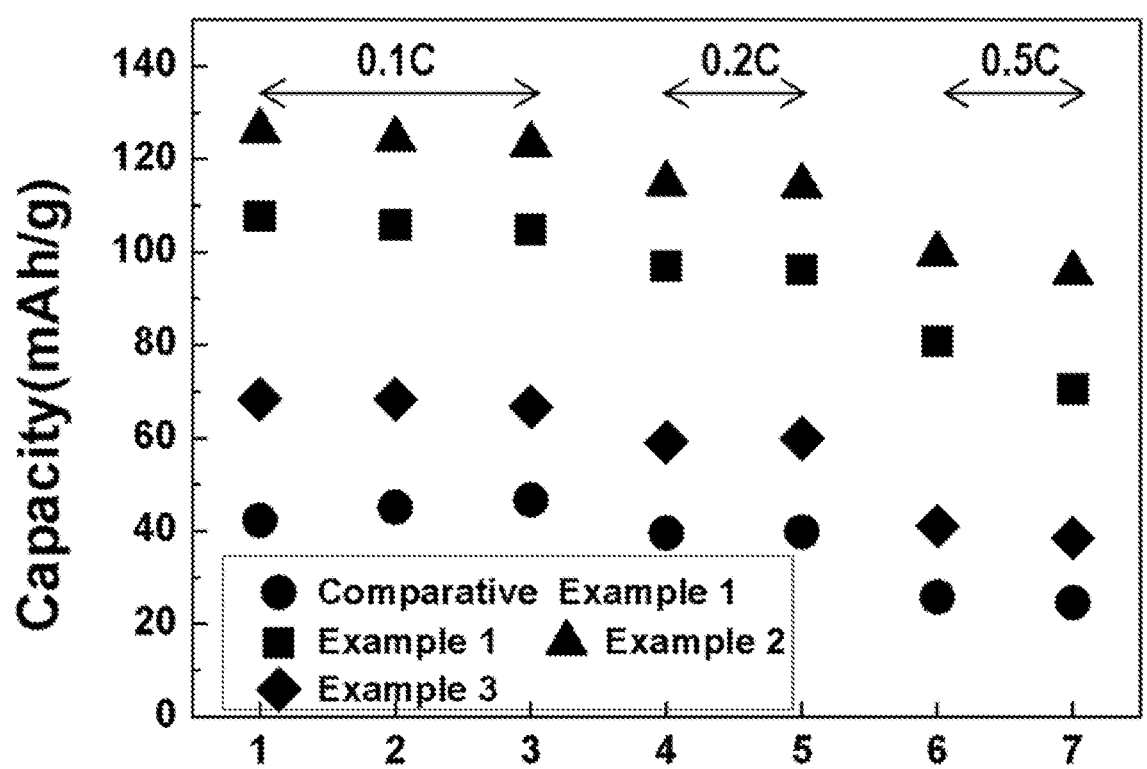
[FIG. 7]

[FIG. 8]
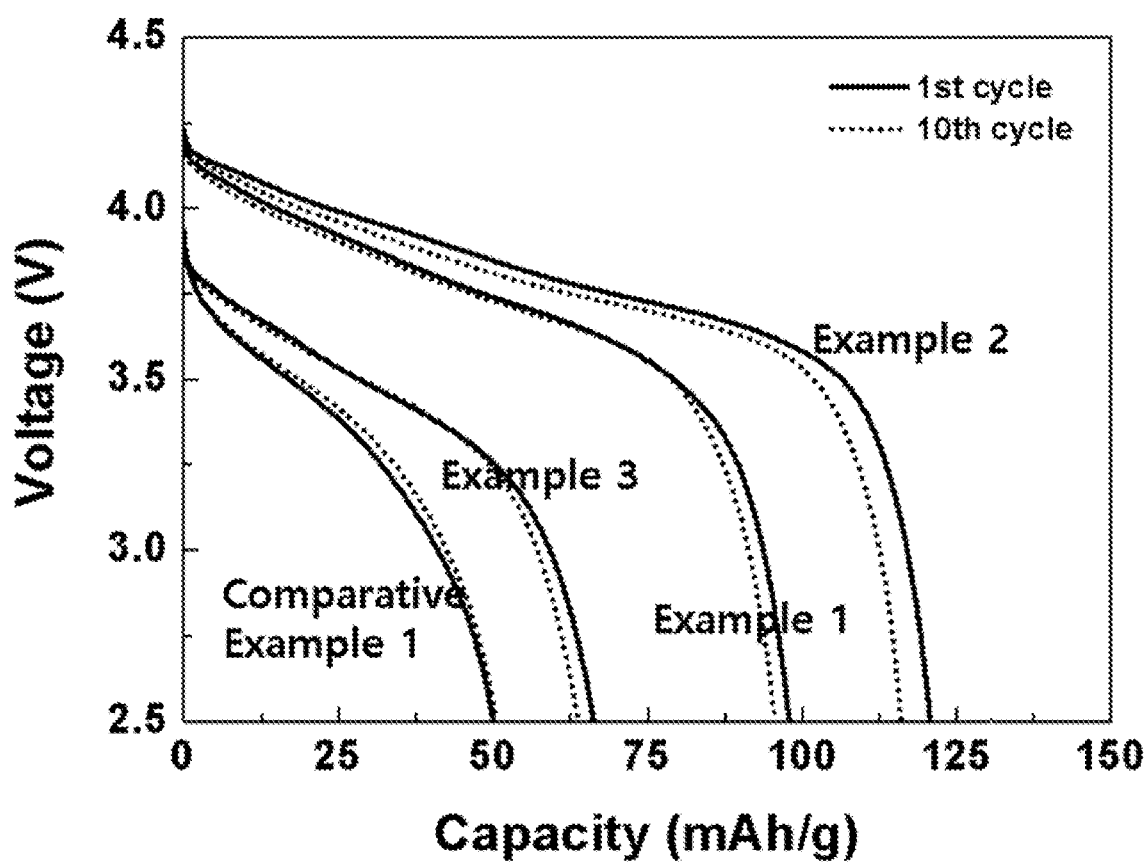

POSITIVE ELECTRODE ACTIVE MATERIAL PARTICLE FOR SULFIDE-BASED ALL-SOLID-STATE BATTERIES

TECHNICAL FIELD

The present invention relates to a positive electrode active material particle for sulfide-based all-solid-state batteries, and more particularly to a positive electrode active material particle for sulfide-based all-solid-state lithium-ion batteries, the surface of which is coated for passivation, a positive electrode including the particle, and a sulfide-based all-solid-state lithium-ion battery including the positive electrode.

BACKGROUND ART

A lithium-ion secondary battery or a lithium secondary battery includes a positive electrode layer, a negative electrode layer, and an electrolyte containing lithium salt interposed between the positive electrode layer and the negative electrode layer. The electrolyte may be a non-aqueous liquid or solid electrolyte. In the case in which a liquid electrolyte is used, it is necessary to equip a battery with a device for minimizing an increase in the temperature of the battery when a short circuit occurs in the battery or with a system for preventing the occurrence of a short circuit in the battery, since the liquid electrolyte is combustible. The danger attributable to the liquid electrolyte has increased due to an increase in the capacity of a battery per unit volume as the result of the appearance of electric products consuming large amounts of electricity, such as electric vehicles, and due to an increase in the absolute capacity of a battery provided for a single system.

An all-solid-state battery, configured such that a solid electrolyte is interposed between a positive electrode and a negative electrode, whereby the battery is completely solidified, fundamentally solves the above problem and does not need additional safety devices, whereby the all-solid-state battery is economical. For these reasons, much research has been conducted into all-solid-state batteries.

A battery having a solid electrolyte applied thereto exhibits higher stability than a conventional liquid electrolyte system. However, the capacity and output of the battery having the solid electrolyte applied thereto are lower than those of the conventional liquid electrolyte system, since the solid electrolyte has lower ion conductivity than the liquid electrolyte. The reason that ion conductivity is low in the battery having the solid electrolyte applied thereto is that the area of contact between an electrode active material and the solid electrolyte is not larger than the area of contact between the electrode active material and the liquid electrolyte in the conventional liquid electrolyte system and that the ion conductivity of the solid electrolyte itself is low.

The ion conductivity of the solid electrolyte has been increased so as to approach the ion conductivity of the liquid electrolyte through the development and improvement of materials. A sulfide-based solid electrolyte has high ion conductivity, and therefore research into all-solid-state batteries to which the sulfide-based solid electrolyte is applied has been very actively conducted. In spite of high ion conductivity, the sulfide-based solid electrolyte still has a problem in which the sulfide-based solid electrolyte reacts with a positive electrode active material at the interface between the sulfide-based solid electrolyte and the positive electrode active material. As the result of reaction with the positive electrode active material, the sulfide-based solid electrolyte forms a new phase at the interface between the sulfide-based solid electrolyte and the positive electrode active material, and the new phase acts as a resistor, whereby the electrochemical performance of the battery is deteriorated.

In order to solve the above problem, a method of improving the positive electrode active material, particularly a coating method that is capable of passivating the surface of the positive electrode active material, has been proposed. Passivation is a process of treating the surface of a material such that the inherent properties thereof are prevented from being changed by external conditions or stimulation. When the surface of iron contacts oxygen in the air in the state in which the surface of iron is clean, the surface of iron becomes rusty. The treatment for preventing such rust is called passivation.

Patent Document 1 discloses a positive electrode active material particle of an all-solid-state battery including a sulfide-based solid electrolyte, wherein the positive electrode active material particle is an aggregate including two or more particles and wherein a reaction barrier layer for inhibiting reaction with the sulfide-based solid electrolyte is coated on the surface of the aggregate. The reaction barrier layer, which is coated on the positive electrode active material particle, is made of $LiNbO_3$, $Li_4SiO_4$, $Li_3PO_4$, $Li_3BO_3$, $Li_2SiO_3$, $LiPO_3$, $LiBO_2$, $Li_2SO_4$, $Li_2WO_4$, $Li_2MoO_4$, $Li_2ZrO_3$, $LiAlO_2$, $Li_2TiO_3$, $Li_4Ti_5O_{12}$, or a composite oxide thereof. According to Patent Document 1, a precursor solution for the reaction barrier layer is manufactured, coated, and dried in order to form the reaction barrier layer.

Patent Document 2 discloses a method of manufacturing an electrode active material having a core-shell structure for all-solid-state batteries, wherein a high-resistance impurity formed as the result of treating an active material, such as LiOH or $Li_2CO_3$, is used as a precursor and wherein the precursor is treated using acid and heat in order to manufacture an active material, the surface of which is coated with a crystallized lithium oxide layer, thereby reducing the resistance at the interface between the active material and the solid electrolyte. The lithium oxide layer is $Li_3PO_4$, $Li_2B_4O_7$, or a mixture thereof. According to Patent Document 2, a wet process including a solvent is used in order to form the coating layer or the lithium oxide layer in the same manner as in Patent Document 1.

Non-Patent Document 1 discloses a method of treating the surface of a positive electrode active material of an all-solid-state lithium battery, wherein a positive electrode active material, the surface of which is treated with $Li_3BO_3$—$Li_2CO_3$ (LBO-LCO or $Li_{3-x}B_{1-x}C_xO_3$ (LBCO)), is manufactured using a wet process. Non-Patent Document 1 makes mention of a process advantage in which coating is performed using water in place of a conventional volatile organic solvent. In addition, Non-Patent Document 1 makes mention of the fact that impurities present near a positive electrode active material particle including $LiCoO_2$, such as $LiCO_3$, or LiOH, are removed through the coating. According to Non-Patent Document 1, the positive electrode active material particle is coated using a wet coating method; however, it is necessary to improve the charge/discharge characteristics thereof.

Although a reaction at the interface between the sulfide-based solid electrolyte and the positive electrode active material is inhibited through surface treatment of the positive electrode active material, as described above, the charge/discharge characteristics of a battery manufactured using the same are still unsatisfactory, and therefore there is a need to improve the charge/discharge characteristics of the battery.

PRIOR ART DOCUMENT

Patent Document

Korean Patent Application Publication No. 2013-0130862 (2013.12.02)
Korean Patent Application Publication No. 2018-0041872 (2018.04.25)

Non-Patent Document

Chem. Mater., 2018, 30 (22), pp 8190-8200

DISCLOSURE

Technical Problem

The present invention has been made in view of the above problems, and it is an object of the present invention to provide a new method of treating the surface of a positive electrode active material that is capable of inhibiting a reaction at the interface between a sulfide-based solid electrolyte and the positive electrode active material. It is another object of the present invention to provide an excellent positive electrode active material particle for sulfide-based all-solid-state batteries, the surface of which is reformed, using the method and a sulfide-based all-solid-state battery, the charge/discharge characteristics of which are improved, including the same.

Technical Solution

In accordance with an aspect of the present invention, the above and other objects can be accomplished by the provision of a method of manufacturing a positive electrode active material particle for sulfide-based all-solid-state batteries, the method including a step of mixing and thermally treating the positive electrode active material particle, which is dried, and dried boron.

In accordance with other aspects of the present invention, there are provided a positive electrode active material particle for sulfide-based all-solid-state batteries manufactured using the method, a positive electrode for sulfide-based all-solid-state batteries including the particle, and a sulfide-based all-solid-state battery including the positive electrode.

Effects of the Invention

The present invention provides a new method of treating the surface of a positive electrode active material that is capable of inhibiting a reaction at the interface between a sulfide-based solid electrolyte and the positive electrode active material. In addition, the present invention provides an excellent positive electrode active material particle for sulfide-based all-solid-state batteries, the surface of which is reformed, using the method and a sulfide-based all-solid-state battery, the charge/discharge characteristics of which are improved, including the same. The positive electrode active material particle for sulfide-based all-solid-state batteries manufactured using the new dry-type method according to the present invention exhibits larger capacity than a positive electrode active material particle for sulfide-based all-solid-state batteries manufactured through a conventional wet-type process. In addition, the manufacturing process is simplified, and the quantity of byproducts is reduced.

BRIEF DESCRIPTION OF DRAWINGS

FIG. 1 is a view showing the values of ion conductivities of LBO materials that are theoretically calculated using computational chemistry.
FIG. 2 is a view showing the results of analysis of a positive electrode active material particle for sulfide-based all-solid-state batteries manufactured in accordance with an embodiment of the present invention using Time-of-Flight Secondary Ion Mass Spectrometry (TOF-SIMS).
FIGS. 3 and 4 are views showing charge/discharge voltage profiles of Examples and Comparative Examples.
FIGS. 5 and 6 are views showing initial charge/discharge voltage profiles of batteries manufactured according to Examples and Comparative Example.
FIG. 7 is a view showing changes in the capacities of the batteries manufactured according to Examples and Comparative Example based on discharging speeds; and
FIG. 8 is a view showing changes in the capacities of the batteries manufactured according to Examples and Comparative Example after ten cycles.

DETAILED DESCRIPTION OF THE INVENTION

Reference will now be made in detail to the preferred embodiments of the present invention, examples of which are illustrated in the accompanying drawings.

The present invention relates to a method of manufacturing a positive electrode active material particle for sulfide-based all-solid-state batteries, the method including mixing and thermally treating the positive electrode active material particle and dried boron, wherein the positive electrode active material particle that is mixed and thermally treated is a dried positive electrode active material particle.

The dried positive electrode active material particle has a moisture content of 100 ppm or less. Prior to mixing and thermally treating, the positive electrode active material particle, a step of washing the positive electrode active material particle is conducted with water in order to remove impurities therefrom may be performed, and then drying the washed positive electrode active material particle.

The thermal treatment is performed at a temperature of 200° C. to 650° C., preferably 250° C. to 350° C. In the case in which the dried positive electrode active material particle and the dried boron are mixed and thermally treated, the form of LBO that is generated varies depending on the thermal treatment temperature. The thermal treatment temperature is 1 hour or more, preferably 5 hours or more. The term "LBO" used in this specification means all coating materials including lithium (L), boron (B), and oxygen (O), such as $LiBO_2$, $LiBO_3$, $Li_2B_4O_7$, $LiB_3O_5$, and $Li_3BO_3$.

An LCO single layer, which has carbon (C) introduced into LBO in place of B, such as $Li_2CO_3$, an LBO-LCO dual layer, or an LBCO single layer, such as $Li_{3-x}B_{1-x}C_xO_3$, may be formed as a coating layer of the positive electrode active material particle (see Non-Patent Document 1).

In particular, an LBO coating layer made of a mixture of $LiBO_2$ and $Li_2B_4O_7$ is formed on the surface of the positive electrode active material particle through the thermal treatment according to the present invention. FIG. 1 is a view showing the values of ion conductivities of LBO materials that are theoretically calculated using computational chemistry. In the present invention, $Li_2B_4O_7$, which has high ion conductivity, i.e. a low lithium ion migration barrier value, is introduced based on the calculation. The inventors of the present application have made an effort to introduce LBO having high ion conductivity into the positive electrode active material particle and have completed the present invention by dry-mixing and thermally treating an LBO layer, which is difficult to realize in a conventional wet-type method.

In particular, it is very difficult for those skilled in the art to predict LBO realized differently depending on the thermal treatment temperature. FIG. 2 is a view showing the results of analysis of a positive electrode active material particle for sulfide-based all-solid-state batteries manufactured in accordance with an embodiment of the present invention using Time-of-Flight Secondary Ion Mass Spectrometry (TOF-SIMS). In TOF-SIMS, positive ions and negative ions emitted while primary ions strike the surface of a material may be analyzed in order to acquire the chemical ingredients of the material and the structure of the surface of the material. As can be seen from the following table, the mass per unit electric charge (m/z) of LBO is the inherent value of each material. Referring to FIG. 2, the amounts of materials depending on the thermal treatment temperature are analyzed using TOF-SIMS.

| m/z | 66 | 77 | 93 | 113 | 143 |
|---|---|---|---|---|---|
| ion | $LiBO_3^-$ | $LiB_2O_3^-$ | $LiB_2O_4^-$ | $B_3O_5^-$ | $Li_2B_3O_6^-$ |

In the case in which thermal treatment is performed within the temperature range according to the present invention, it can be seen that $LiBO_3^-$ having an m/z of 66, i.e. $LiBO_2$, and $LiB_2O_4^-$ having an m/z of 93, i.e. $Li_2B_4O_7$, will be generated in the largest quantities.

The dried positive electrode active material particle, which is the feature of the present invention, and the dried boron are mixed at a weight ratio of 1000:1 to 10:1. The capacity of a battery is changed depending on the amount of boron that is introduced. For a sulfide-based all-solid-state battery, therefore, it is necessary to predetermine the amount of boron that is introduced. In the case in which boron is introduced in less than 0.1 wt % of the positive electrode active material particle, the effect of inhibiting the interface reaction according to the present invention is not successfully obtained. In the case in which boron is introduced in greater than 10 wt % of the positive electrode active material particle, the thermal treatment time is excessively increased, and coating is not uniformly formed.

The positive electrode active material particle according to the present invention may be selected from the group consisting of at least one of a layered compound, such as a lithium manganese composite oxide (such as $LiMn_2O_4$ or $LiMnO_2$), a lithium cobalt oxide ($LiCoO_2$), or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; or $Fe_2(MoO_4)_3$; and derivatives thereof.

The present invention provides a positive electrode active material particle for sulfide-based all-solid-state batteries manufactured using the above method, a positive electrode for sulfide-based all-solid-state batteries including the particle, and a sulfide-based all-solid-state battery including the positive electrode.

Sulfide-Based Solid Electrolyte

A sulfide-based solid electrolyte according to the present invention includes a sulfide-based particle. The surface of the sulfide-based particle may be coated or reformed. The sulfide-based solid electrolyte is manufactured using a mixture including the particle through a dry or wet process.

In the present invention, the sulfide-based particle is not particularly restricted. All well-known sulfide-based materials used in the lithium battery field are available. Any sulfide-based materials available on the market may be used, or a material manufactured by crystallizing an amorphous sulfide-based material may also be used.

Typically, $Li_6PS_5Cl$ (LPSCl), Thio-LISICON ($Li_{3.25}Ge_{0.25}P_{0.75}S_4$), $Li_2S$—$P_2S_5$—$LiCl$, $LiC_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$, $Li_7P_3S_{11}$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $Li_{10}GeP_2S_{12}$, $Li_{9.54}Si_{1.74}P_{1.44}S_{11.7}Cl_{0.3}$, or $Li_7P_3S_{11}$ may be used.

The average size of sulfide-based particles is, for example, 0.1 μm to 50 μm, preferably 0.5 μm to 20 μm, which is within the size range of sulfide-based particles used in well-known all-solid-state batteries. In the case in which the average size of the sulfide-based particles is less than the above range, the sulfide-based particles may form lumps. In the case in which the average size of the sulfide-based particles is greater than the above range, on the other hand, the porosity of the manufactured solid electrolyte is high, whereby the characteristics of the battery may be deteriorated. For example, the capacity of the battery may be reduced.

Preferably, the sulfide-based particle has an ion conductivity of $1\times10^{-4}$ S/cm or more. More preferably, the sulfide-based particle has an ion conductivity of $1\times10^{-3}$ S/cm or more.

In addition to the above-mentioned sulfide-based solid electrolytes, other well-known solid electrolytes may also be used. For example, an inorganic solid electrolyte, such as $Li_2O$—$B_2O_3$, $Li_2O$—$B_2O_3$—$P_2O_5$, $Li_2O$—$V_2O_5$—$SiO_2$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1), or $Li_{3.6}Si_{0.6}P_{0.4}O_4$, may be used.

Manufacture of All-Solid-State Battery

Specifically, an all-solid-state battery according to the present invention includes a positive electrode, a negative electrode, and a sulfide-based solid electrolyte interposed between the positive electrode and the negative electrode.

The electrode of the all-solid-state battery has a structure in which an electrode active material is formed on an electrode current collector. The electrode current collector may be omitted depending on the structure of the electrode. In the case in which the electrode is a positive electrode, the electrode current collector is a positive electrode current collector. In the case in which the electrode is a negative electrode, the electrode current collector is a negative electrode current collector.

The all-solid-state battery is manufactured through a dry compression process, in which electrode powder and solid electrolyte powder are manufactured, introduced into a predetermined mold, and pressed, or a slurry coating process, in which a slurry composition including an active material, a solvent, and a binder is manufactured, coated on a current collector, and dried. In the present invention, the method of manufacturing the all-solid-state battery having the above structure is not particularly restricted. Any well-known method may be used.

For example, the solid electrolyte is disposed between the positive electrode and the negative electrode, and then the same is compressed in order to assemble a cell. The assembled cell is mounted in a sheathing member, and then the sheathing member is encapsulated by heating and compression. A laminate case made of aluminum or stainless steel, a cylindrical metal container, or a prismatic metal container may be appropriately used as the sheathing member.

The electrode slurry may be coated on the current collector using a method of placing the electrode slurry on the current collector and uniformly dispersing the electrode slurry with a doctor blade, a die casting method, a comma coating method, or a screen printing method. Alternatively, the electrode slurry and the current collector may be formed on a separate substrate, and the electrode slurry and the current collector may be joined to each other through pressing or lamination. At this time, the concentration of a slurry solution or the number of coatings may be adjusted in order to adjust the final coating thickness.

The drying process is a process of removing the solvent or moisture from the slurry in order to dry the slurry coated on the metal current collector. The drying process may vary depending on the solvent that is used. For example, the drying process may be performed in a vacuum oven having a temperature of 50° C. to 200° C. For example, drying may be performed using a warm-air drying method, a hot-air drying method, a low-humidity-air drying method, a vacuum drying method, a (far-) infrared drying method, or an electron beam radiation method. The drying time is not particularly restricted. In general, drying is performed within a range of 30 seconds to 24 hours.

After the drying process, a cooling process may be further performed. In the cooling process, slow cooling to room temperature may be performed such that the recrystallized structure of the binder is sufficiently formed.

In addition, if necessary, a rolling process, in which the electrode is passed through a gap between two heated rolls such that the electrode is compressed so as to have a desired thickness, may be performed in order to increase the capacity density of the electrode and to improve adhesion between the current collector and the active material after the drying process. In the present invention, the rolling process is not particularly restricted. A well-known rolling process, such as pressing, may be performed. For example, the electrode may pass through a gap between rotating rolls, or a flat press machine may be used to press the electrode.

Positive Electrode

A positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver.

A positive electrode active material includes an excellent positive electrode active material particle for sulfide-based all-solid-state batteries, the surface of which is reformed, according to the present invention. In addition, an additional material may be used depending on what a lithium secondary battery is used for. For example, a transition-metal-compound-based active material or a sulfide-based active material may be used.

Specifically, the positive electrode active material particle, before the surface thereof is treated, may be selected from the group consisting of at least one of a layered compound, such as a lithium manganese composite oxide ($LiMn_2O_4$ or $LiMnO_2$), a lithium cobalt oxide ($LiCoO_2$), or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; or $Fe_2(MoO_4)_3$; and derivatives thereof.

For example, an oxide, sulfide, or halide of scandium, ruthenium, titanium, vanadium, molybdenum, chrome, manganese, iron, cobalt, nickel, copper, or zinc may be used as the transition metal compound. More specifically, $TiS_2$, $ZrS_2$, $RuO_2$, $CO_3O_4$, $Mo_6S_8$, or $V_2O_5$ may be used. However, the present invention is not limited thereto.

A sulfur element, a disulfide compound, an organosulfur compound, or a carbon-sulfur polymer ($(C_2S_x)_n$, where x=2.5 to 50, n≥2) may be used as the sulfide-based active material. Other well-known materials may also be included.

Negative Electrode

A negative electrode current collector is not particularly restricted, as long as the negative electrode current collector exhibits high conductivity while the negative electrode current collector does not induce any chemical change in an all-solid-state battery. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may be configured in any of various forms, such as that of a film, a sheet, a foil, a net, a porous body, a foam body, or a non-woven fabric body, on the surface of which a micro-scale uneven pattern is formed.

A negative electrode active material may be selected from the group consisting of a lithium metal, a lithium alloy, a lithium-metal composite oxide, a titanium composite oxide containing lithium (LTO), and combinations thereof. An alloy of lithium and at least one metal selected from among Na, K, Rb, Cs, Fr, Be, Mg, Ca, Sr, Ba, Ra, Al, and Sn may be used as the lithium alloy. In addition, the lithium-metal composite oxide may include lithium and an oxide ($MeO_x$) of a metal (Me) selected from the group consisting of Si, Sn, Zn, Mg, Cd, Ce, Ni, and Fe. For example, the lithium-metal composite oxide may be $Li_xFe_2O_3$ (0<x≤1) or $Li_xWO_2$ (0<x≤1).

In addition, a metal composite oxide, such as $Sn_xMe_{1-x}Me'_yO_z$ (Me: Mn, Fe, Pb, Ge; Me': Al, B, P, Si, Group 1, 2 and 3 elements of the periodic table, halogen; 0<x≤1; 1≤y≤3; 1≤z≤8), or a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$, may be used as the negative electrode active material. Furthermore, carbon-based negative electrode active materials, such as crystalline carbon, amorphous carbon, and a carbon composite, may be used, either alone or in a combination of two or more components.

Conductive Agent and Dispersant

As needed, a conductive agent, a solid electrolyte, or a dispersant may be further included, in addition to the active material.

Nickel powder, a cobalt oxide, a titanium oxide, or carbon may be used as the conductive agent. At least one selected from the group consisting of Ketjen black, acetylene black, furnace black, graphite, carbon fiber, and fullerene may be used as the carbon.

Hereinafter, the present invention will be described with reference to the following examples. These examples are provided only for illustration of the present invention and should not be construed as limiting the scope of the present invention.

EXAMPLES

Examples 1, 2, and 3: Manufacture of Positive Electrode Active Material Particles for Sulfide-Based All-Solid-State Batteries a) A positive electrode active material NCM 811 was washed using water. NCM 811 is a positive electrode active material including nickel, cobalt, and manganese in a ratio of 8:1:1.

b) The washed NCM 811 (hereinafter, simply referred to as NCM) was dried at a high temperature such that the content of water therein became 100 ppm or less. The content of water in NCM was measured using a Karl Fischer titrator. The content of water in NCM was performed according to the following chemical equation.

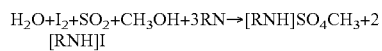

c) Boron and NCM were mixed in a dried state so as to have the following ratios.

Example 1=5 mg of boron:1 g of NCM (Content of B: 874 ppm)
Example 2=10 mg of boron:1 g of NCM (Content of B: 1,748 ppm)
Example 3=20 mg of boron:1 g of NCM (Content of B: 3,497 ppm)
Example 4=same as Example 1 except that the content of B is 1,000 ppm Boron and NCM were mixed so as to have ratios according to Examples, and were then mixed using a mortar mixer for 10 to 15 minutes in a dried state.

d) The dry-mixed mixtures were thermally treated at a temperature of 300° C. for 5 hours.

e) The thermally treated positive electrode active material particles were stored in desiccators for subsequent processes.

Comparative Example 1

A positive electrode active material was manufactured in the same manner as in Examples except that boron was not used.

Comparative Example 2

LNO was manufactured as follows using a wet coating method.

2 wt % of LNO was manufactured as follows. 7.03 mg of lithium ethoxide ($CH_3CH_2OLi$), 33.94 mℓ of niobium ethoxide ($Nb(OCH_2CH_3)_5$), and 10 mℓ of anhydrous ethanol were put into a round flask, and were then stirred until the lithium ethoxide were dissolved. After 20 to 30 minutes, 1 g of NCM 811 was added and mixed with the above materials for about 2 hours. Subsequently, the solvent was sufficiently dried using a rotary evaporator. Dried powder was collected, and was then thermally treated at a temperature of 450° C. for 1 hour.

Comparative Example 3

$Li_2B_4O_7$ was manufactured as follows using a wet coating method.

2 wt % of $Li_2B_4O_7$ was manufactured as follows. 9.925 mg of $LiOH-9H_2O$, 29.25 mg of niobium ethoxide $B(OH)_3$, and 10 mℓ of anhydrous ethanol were put into a round flask, and were then stirred until the solutes were completely dissolved. After 20 to 30 minutes, 1 g of NCM 811 was added and mixed with the above materials for about 2 hours. Subsequently, the solvent was sufficiently dried using a rotary evaporator. Dried powder was collected, and was then thermally treated at a temperature of 500° C. for 1 hour.

Manufacture Example: Manufacture of All-Solid-State Batteries a) The lower end of a cell made of polyether ether ketone (PEEK) (having a diameter of 1 cm) was closed using a plunger (having a diameter of 1 cm), 75 mg of a sulfide-based solid electrolyte LPSCl (NEI Company) was put into the cell made of PEEK, and the upper end of the cell made of PEEK was closed using another plunger. Subsequently, a pressure of 370 MPa was applied to the cell made of PEEK using a hydraulic pressure (the pressure was maintained for 1 to 2 minutes) in order to manufacture LPSCl pellets in the cell made of PEEK.

b) 60 mg of the positive electrode active material manufactured according to each of Examples and Comparative Examples and 40 mg of LPSCl were put into a small mortar mixer and were then mixed for about 10 minutes in order to manufacture a positive electrode composite including the positive electrode active material and the solid electrolyte in a ratio of 6:4.

c) The upper plunger was removed from the cell, 10 mg of the manufactured positive electrode composite was put into the cell, the cell was sufficiently shaken such that the positive electrode composite was uniformly applied onto the solid electrolyte, the upper plunger was mounted to the cell, and a pressure of 370 MPa was applied to the cell in order to manufacture pellets.

d) The lower plunger was removed from the cell, an LiIn alloy, which had been manufactured in advance, was put into the cell, the lower plunger was mounted to the cell, and a pressure of about 120 MPa was applied to the cell for about 1 seconds in order to manufacture pellets.

All cells were manufactured in a glove box saturated with argon (Ar).

Experimental Example 1: Lifespan Test

The charge/discharge cycle lifespans of the all-solid-state batteries manufactured according to Manufacture Example were measured under conditions of a temperature of 25° C. and a voltage of 2.5 to 4.3 V in order to analyze the charge/discharge capacity retention rates of the batteries with respect to the initial capacities thereof. The results are shown in Tables 1 and 2 and FIGS. 3 to 7.

Table 1 and FIG. 3 show the results of measurement of the charge/discharge cycle (0.2 C) capacities of the batteries manufactured according to Example 4 and Comparative Examples 1, 2, and 3. It can be seen that the efficiency of the battery manufactured according to Example 4 was higher than the efficiencies of the batteries manufactured according to Comparative Examples.

TABLE 1

| Sample | | Voltage 1.875 V to 3.675 V (2.5 V to 4.3 V) | | | |
|---|---|---|---|---|---|
| | | Comparative Example 1 | Example 4 | Comparative Example 2 | Comparative Example 3 |
| Charge (0.2 C) | mAh/g | 100.4 | 183.0 | 164.3 | 106.3 |
| Discharge (0.2 C) | | 42.3 | 122.9 | 102.1 | 53.5 |
| Efficiency | % | 42.1 | 67.1 | 62.1 | 50.3 |

Table 2 and FIG. 4 show the results of measurement of the charge/discharge cycle (0.1 C) capacities of the batteries manufactured according to Comparative Example 1 and Examples 1, 2, and 3. It can be seen that the efficiencies of the batteries manufactured according to Examples were higher than the efficiencies of the battery manufactured according to Comparative Example.

TABLE 2

| B content (ppm) | | Voltage 1.875 V to 3.675 V (2.5 V to 4.3 V) | | | |
|---|---|---|---|---|---|
| | | 0 Comparative Example 1 | 874 Example 1 | 1748 Example 2 | 3497 Example 3 |
| Charge (0.1 C) | mAh/g | 100.4 | 154.5 | 171.1 | 104.3 |
| Discharge (0.1 C) | | 42.3 | 107.7 | 126.2 | 68.3 |
| Efficiency | % | 42.1 | 69.7 | 73.8 | 65.5 |

FIGS. 5 and 6 show the results of measurement of initial profiles 0.1 C/0.2 C and 0.1 C/0.5 C of the batteries manufactured according to Comparative Example 1 and Examples 1, 2, and 3, respectively. It can be seen that the initial voltages of the batteries manufactured according to Examples were not abruptly decreased. FIG. 7 shows the comparison between the capacities of the batteries manufactured according to Comparative Example and Examples. It can be seen that all of the batteries manufactured according to Examples exhibited excellent characteristics.

FIG. 8 shows the comparison between the charge/discharge cycle capacities of the batteries manufactured according to Examples 1, 2, and 3 and Comparative Example 1. It can be seen that all of the batteries manufactured according to Examples had capacities higher than the capacity of the battery manufactured according to Comparative Example.

As is apparent from the above description, it can be seen that the all-solid-state battery including the positive electrode active material particle for all-solid-state batteries according to the present invention exhibits excellent performance and, in particular, excellent lifespan characteristics.

Those skilled in the art to which the present invention pertains will appreciate that various applications and modifications are possible based on the above description, without departing from the scope of the present invention.

The invention claimed is:

1. A method of manufacturing a positive electrode active material particle for sulfide-based all-solid-state batteries, the method comprising
    mixing and thermally treating a dried positive electrode active material particle and dried boron to produce the positive electrode active material particle.

2. The method according to claim 1, wherein the dried positive electrode active material particle has a moisture content of 100 ppm or less.

3. The method according to claim 2, further comprising prior to mixing and thermally treating, washing a first positive electrode active material particle with water in order to remove impurities therefrom to produce a washed positive electrode active material particle; and then drying the washed positive electrode active material particle to produce the dried positive electrode active material particle.

4. The method according to claim 1, wherein the thermal treatment is performed at a temperature of 200° C. to 650° C.

5. The method according to claim 4, wherein the thermal treatment is performed at a temperature of 250° C. to 350° C. for 5 hours.

6. The method according to claim 1, wherein the dried positive electrode active material particle and the dried boron are mixed at a weight ratio of 1000:1 to 10:1.

7. The method according to claim 1, wherein the positive electrode active material particle comprises at least one selected from a group consisting of a lithium manganese composite oxide; a lithium cobalt oxide; a lithium nickel oxide; a compound substituted with one or more transition metals; a lithium manganese oxide represented by the chemical formula $Li_{1+x}Mn_{2-x}O_4$ where x=0 to 0.33; a lithium manganese oxide; a lithium copper oxide; a vanadium oxide; an Ni-sited lithium nickel oxide represented by the chemical formula $LiNi_{1-x}M_xO_2$ where M=Co, Mn, Al, Cu, Fe, Mg, B, or Ga, and x=0.01 to 0.3; a lithium manganese composite oxide represented by the chemical formula $LiMn_{2-x}M_xO_2$ where M=Co, Ni, Fe, Cr, Zn, or Ta, and x=0.01 to 0.1 or the chemical formula $Li_2Mn_3MO_8$ where M=Fe, Co, Ni, Cu, or Zn; $LiMn_2O_4$ in which a portion of Li in a chemical formula is replaced by alkaline earth metal ions; a disulfide compound; $Fe_2(MoO_4)_3$; and derivatives thereof.

8. The method according to claim 1, wherein a lithium boron oxide (LBO) coating layer comprising a mixture of $LiBO_2$ and $Li_2B_4O_7$ is formed on a surface of the positive electrode active material particle through the thermal treatment.

9. A positive electrode active material particle for sulfide-based all-solid-state batteries manufactured using the method according to claim 1.

10. A positive electrode for a sulfide-based all-solid-state battery comprising
    the positive electrode active material particle according to claim 9.

11. A sulfide-based all-solid-state battery comprising
the positive electrode according to claim 10.

* * * * *